Figure 1:
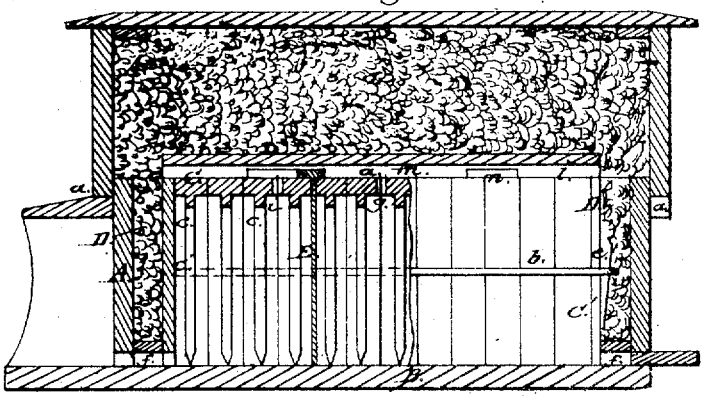
Figure 2:
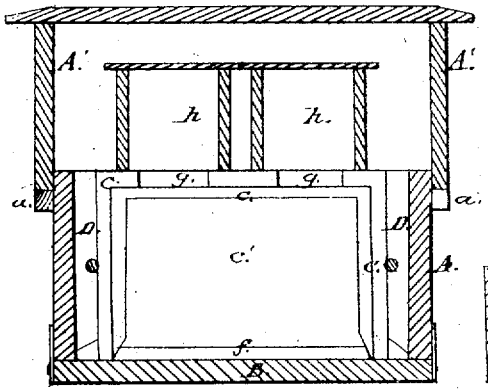
Figure 5:
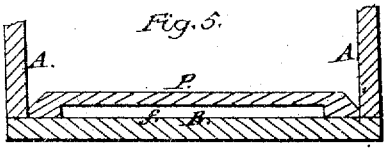
Figure 3:
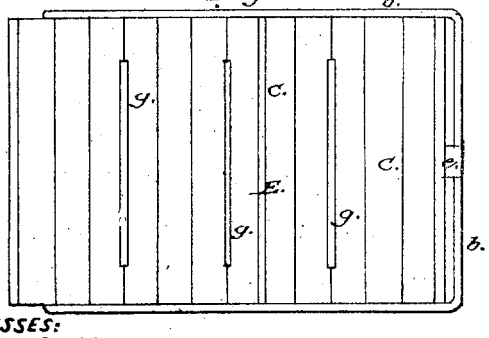
Figure 4:
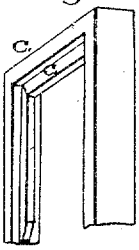

J. M. Beebe;

Bee Hive.

No. 2,984. Reissued June 16. 1868.

WITNESSES:
M. A. Robinson
Theodore F. Frank

INVENTOR:
James M. Beebe
by Forbush & Hyatt
attorneys

UNITED STATES PATENT OFFICE.

JAMES M. BEEBE, OF CASADAGA, NEW YORK.

IMPROVEMENT IN BEE-HIVES.

Specification forming part of Letters Patent No. 70,782, dated November 12, 1867; Reissue No. 2,984, dated June 16, 1868.

*To all whom it may concern:*

Be it known that I, JAMES M. BEEBE, of Casadaga, in the county of Chautauqua and State of New York, have invented certain new and useful Improvements in Bee-Hives; and I do hereby declare that the following is a full, clear, and exact description thereof, reference being had to the accompanying drawings and the letters marked thereon, in which—

Figure I is a longitudinal vertical section of my improved hive with the auxiliary boxes removed and the winter-board H arranged in place. Fig. II is a cross-section with the board H removed and the auxiliary boxes in place, showing the condition of the hive in summer. Fig. III is a plan of the inner hive or hive proper. Fig. IV is a perspective view of one of the comb-frames C detached. Fig. V is a cross vertical section of the bottom board through one of the bridges P or bee-entrances.

Like letters of reference designate corresponding parts in all the figures.

The invention consists, first, in the combination and arrangement of the outer case, inner hive, and ventilating-board to permit the packing of the hive in winter to protect the bees from cold; second, in the special means for securing the comb-frames forming the inner hive together.

In the drawings, A represents a rectangular box, made without top or bottom, but which rests when in use upon the bottom board, B, of the hive. A ledge, *a*, is formed around this box on the outside near the top, on which rests another similarly-formed box, A′, as clearly shown in Figs. I and II. This box A′ is provided with a suitable top or cover to protect both boxes, and the hive which is arranged therein.

C C represent a series of comb-frames composed of two upright strips connected by a cross-piece at the top, with a central bead, *c*, on the under side of the top piece, (and sides if desired,) which serves as a guide for the bees in attaching the comb, as most clearly shown in Fig. IV. These frames are preferably made of the height of the case A, and of such a length as to leave a space, D, between their ends and the sides of the surrounding box, for a purpose presently to be explained. A sufficient number of these frames is arranged side by side, snugly fitting together with their ends resting on the bottom board to form a hive of the required size, the ends of which are closed by boards C′ C′. These frames I prefer to secure together by a wire bail, *b*, of the rectangular form of the hive. The ends of this wire are fastened to the edges of one of the end comb-frames, while the frames are arranged within the bail, and then firmly clamped together by a wedge, *e*.

The bees enter the hive through a passage or passages, *f*, recessed in the ends of the hive and case A, as represented. These passages between the ends of the hive and the outer case are bridged over by boards P, which prevent the packing material that is filled in the space D in cold weather from closing the passage, which would cause a suffocation of the bees.

The contiguous edges of some of the cross-pieces of the top of the comb-frames are recessed, so that when the frames are put together a sufficient number of apertures *g g* will be formed for the passage of the bees into the honey-boxes *h h* above.

It is of the utmost importance that the bees in winter be protected from the extreme cold. This I accomplish by removing the honey-boxes and filling in the space above and in the space D around the hive with straw, shavings, or other suitable packing material, J. Before doing this, however, I arrange on top of the hive a board, H, constructed with a ledge, *i*, on each side, which rests on the edge of the hive, so as to leave a space, *m*, between said board and the top of the hive. This space at the ends is left open, and apertures *n n* are also formed in the ledges *i*, so as to permit a free circulation from the hive to the packing material.

Moisture arising from the breath and set free by the heat of the bodies of the bees often freezes, and thus many valuable swarms are killed. The packing material J not only protects the hive in a great degree from the cold, but it rapidly absorbs the moisture exhaling from the hive, and thereby prevents its freezing and forming by gradual fricretion a solid mass of ice around the hive, as it otherwise would.

The ventilating-board H is very essential, as the space *m* formed thereby permits the free escape of the moisture from the hive and through it into the porous packing. Without such protection and space as this board affords the packing material would in a great measure (if not entirely) close the apertures in the top of the hives, and thus prevent the escape of the exhalations.

The bridge P is also of great importance in preventing the bee-entrances *f* from being closed by the packing in winter, which would produce a suffocation of the bees, while in summer it makes the passage continuous from the outer case to the hive, and prevents the bees entering the space surrounding the hive, as they would otherwise be at liberty to do.

It is frequently found advisable to divide a hive of bees by forming what is called an "artificial swarm." The hive for this purpose is readily divided into two compartments by means of a partition-board, E, which is inserted between the comb-frames C at any point required, as represented in Fig. I. With small swarms it is sometimes desirable to reduce the size of the hive. This reduction can obviously be accomplished by the same means.

Making the outer case in two parts enables the upper portion, A′, to be removed in order to get at the surplus honey-boxes without disturbing the lower portion, A. When required, however, the entire case can be easily removed, as in spring for clearing the hive.

The bead *c* of the comb-frames serves as a guide for the bees in attaching their comb thereto, which is thereby made straight.

What I claim as my invention, and desire to secure by Letters Patent, is—

1. The combination and arrangement of the outer case, A A′, ventilating-board H, inner hive, and packing material J, substantially as and for the purpose set forth.

2. Securing the said comb-frames together by means of a wire bail, *b*, and wedge *e*, in the manner shown and described.

Witnesses: JAMES M. BEERE.
AARON SMITH,
WILLIAM SMITH.